Dec. 16, 1947.  R. B. SECOR  2,432,822
PROCESS FOR THERMAL PRECONDITIONING CATALYST IN HYDROCARBON CONVERSION
Filed Oct. 2, 1943
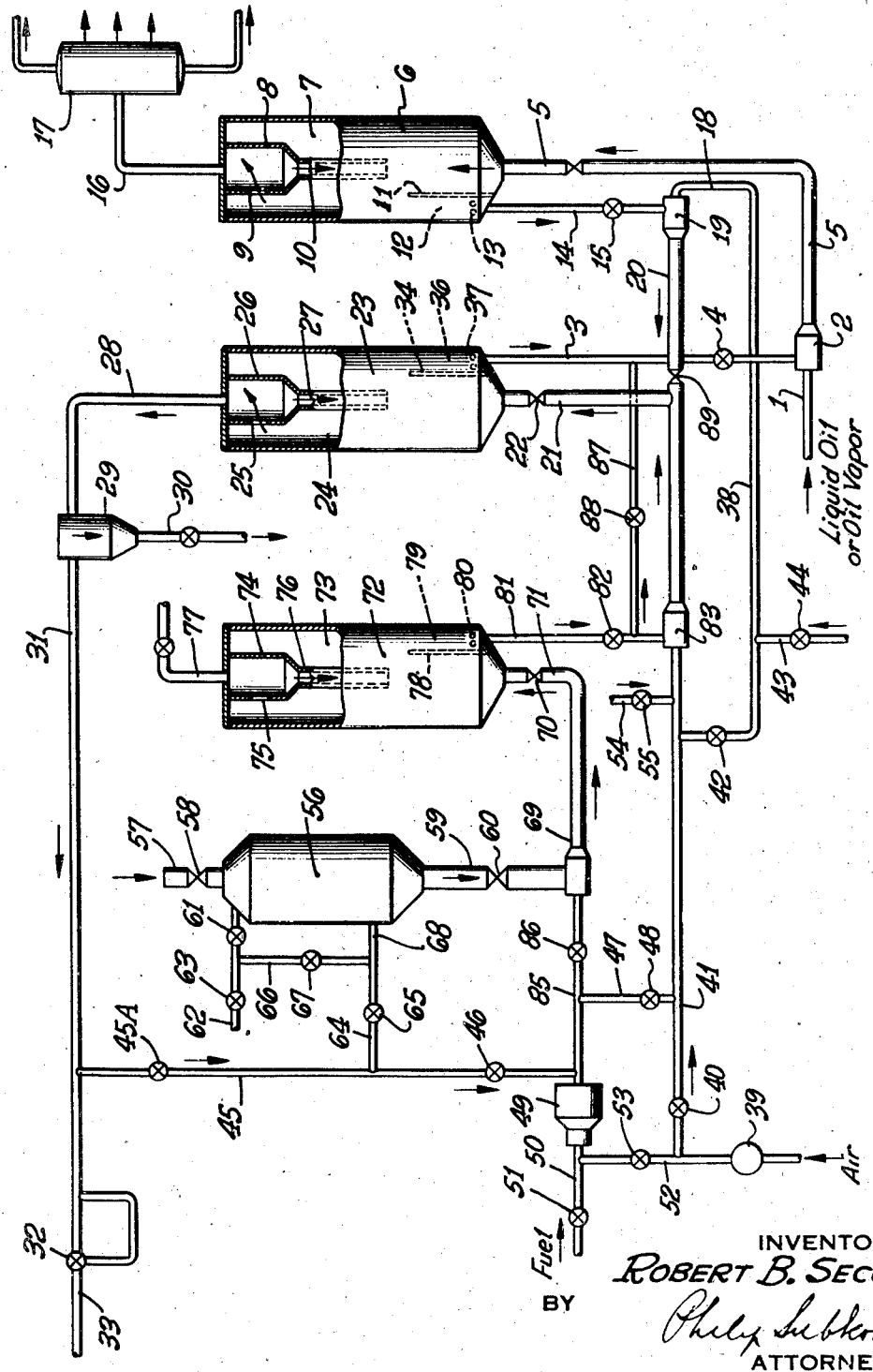
INVENTOR.
ROBERT B. SECOR,
BY
ATTORNEY.

Patented Dec. 16, 1947

2,432,822

UNITED STATES PATENT OFFICE 2,432,822

PROCESS FOR THERMAL PRECONDITIONING CATALYST IN HYDROCARBON CONVERSION

Robert B. Secor, South Gate, Calif., assignor to Filtrol Corporation, Los Angeles, Calif., a corporation of Delaware Application October 2, 1943, Serial No. 504,803

5 Claims. (Cl. 196—52)

This invention relates to a process and apparatus for catalytic cracking, and particularly to a process and apparatus for continuous catalysis employing the "fluid principle."

In the so-called fluid-type cracking process, finely divided cracking catalyst is suspended in vapor to be treated and pneumatically conveyed from a regeneration to a cracking chamber and the spent catalyst is pneumatically conveyed from the cracking chamber to the regeneration zone.

In such processes the catalyst, to a degree which differs as between various types of catalyst, undergoes some mechanical break-down, due to attrition, and must be replenished. The original catalyst as prepared for use in the catalytic process may contain from 10 to 40% moisture, usually 15 to 20%. It is usually sized to contain a minimum amount of material 20 microns in diameter or smaller and also a maximum amount of material passing a 200 mesh screen and usually with 80 to 100% passing a 100 mesh screen. As this catalyst is cycled through the apparatus, the catalytic particles are broken down due to attrition, and losses are encountered due to carry-over of such fines with the exiting gases. It is therefore necessary to replenish the catalyst by adding additional fresh catalyst to maintain the desired quantity of circulating catalyst and a proper particle size distribution in the catalyst.

Catalyst as prepared for use in catalytic plants is usually shipped with moisture contents of from 15 to 20%, although this moisture content of the prepared catalyst before drying may range up to say 40 to 60%. Unless care is taken in removing this water, not only is the catalytic efficiency of the catalyst impaired but also the mechanical strength of the catalyst is reduced. It has been found that a rapid vaporization of the water results in weakening of the catalyst grain and materially increases attrition losses.

This weakening of the catalyst is also increased if the catalyst is brought rapidly to the high levels of the regenerator or catalyst reactor temperature. Heat strains are apparently induced in the catalyst, resulting in zones of weakness in the catalyst which increases the attrition losses.

It is an object of this invention to precondition catalyst prior to introduction of the catalyst into the catalyst system to obtain a catalyst of high catalytic efficiency and high mechanical stability and subject to a minimum mechanical breakdown in fluid-type catalytic processes.

It has been found desirable to add make-up catalyst to the catalyst undergoing regeneration by introducing the make-up catalyst either into the stream entering the regenerator or by introducing the make-up catalyst into the regenerator itself.

By such procedure vapor undergoing catalytic reaction is contacted with a catalyst of uniform quality. Since the make-up catalyst is usually more active than the catalyst which has been subjected to several cycles of regeneration, it is desirable to make a uniform mixture of the fresh catalyst and make-up catalyst before contacting with the reacting vapors.

The catalyst in the system ranges in temperature from about 900° F. to 950° F. as it is withdrawn from the catalytic reactor to from 1000° F. to 1050° F. attained in the regenerator. The range of temperature, i. e., that of the reactor and regenerator, may be termed the "operating temperatures" or the range of operating temperatures for the catalyst cycle. The addition of a small amount of make-up catalyst at room temperature to a large amount of catalyst in the system will suddenly raise the temperature of the make-up catalyst to substantially the temperature of the catalyst stream with which it is mixed.

The catalyst is thus shocked by being suddenly raised from about atmospheric temperature to the temperature of the regenerator. Since the catalyst is usually associated with from 10 to 20% water, the sudden increase of temperature from atmospheric to 900° F. to 1050° F. causes a rapid vaporization of the water from the interior of the catalyst grains, thus either shattering the particles or imposing strains in the grain and thus increasing the tendency of the particle break-downs.

Catalyst of desirable grain hardness and catalytic activity is obtained by a gradual heating of the catalyst to the temperature of the circulating catalyst at the point of mixture of the make-up catalyst and the catalyst stream in the system.

The catalytic activity of the catalyst is also enhanced by slowly raising the temperature above that required to dehydrate the catalyst, that is, about 500° F. to 600° F. and up to the cracking temperature, say 850° F. to 950° F. or up to the regeneration temperature of 1000° to 1100° F. Such controlled heating or calcination of the catalyst is important since cracking catalysts are usually heat sensitive and may be impaired in cracking efficiency by too sudden or too prolonged heating at an elevated temperature.

In order to control the catalytic activity and mechanical stability of the catalyst which is used to replenish the circulating stream, such catalyst is subjected in the process of my invention to a heat treatment, or heat conditioning operation. The catalyst is heated gradually up to about 400° to 600° F. and the water evaporated slowly. As the catalyst is dried out the temperature is raised up to 400° to 600° F. The catalyst will have its water content reduced from 25 to about 5% to 10% at the 400° to 600° temperature level. The catalyst is then raised in temperature gradually or in stages until it is at the operating temperature, either that of the cracking operation or at that of the regenerator. For example, the catalyst may be heated to not exceed the maximum temperature attained in the catalyst operation, usually that of the regenerator. The heat conditioned catalyst is then introduced into the regenerator zone.

The catalyst, particularly if it be an acid-treated montmorillonite clay catalyst, may also be conditioned by this treatment of careful drying and calcination so that the rough protuberances of the clay granules are removed. In this manner a catalyst is produced which which will also resist any formation of fines as a result of the attrition occurring in the catalyst unit While I have in the above discussion referred to the preconditioning of the make-up catalyst, the same principle applies to the original catalyst charge. This, too, may be by the above procedure heat treated before initially charging the cracking apparatus when the process is started up with a new batch of catalyst.

This invention will be further described in connection with the accompanying drawing, in which the figure illustrates a flow sheet, partly schematic, of one particular embodiment of my invention.

In this embodiment, the catalytic process described will be that of catalytic cracking in which an oil in vapor form is subjected at high temperature to cracking in the presence of a catalyst.

The catalyst employed may be an alumino-silica gel catalyst or a magnesia-silica gel, or it may be, and preferably is, an acid-treated sub-bentonite of the montmorillonite family. Catalysts of this character are now known as useful catalysts in "fluid" system of catalysis.

An especially useful clay of high catalytic activity and suitable for use in my process is produced by treating a sub-bentonite of the montmorillonite family, such as is commonly employed in the production of decolorizing and catalytic clays of high decolorizing and catalytic activity, with an acid solution of about 15% concentration (based on the total moisture content of the mix), employing about 30% by weight of $H_2SO_4$ (calculated as anhydrous) based upon volatile free clay, until about one-third of the alumina content of the clay has been removed. The resulting clay is washed, dried, and ground. This material is ground to the following mesh size, which is characteristic:

Per cent through 100 mesh screen 80–100%, for example, 93.3%
Per cent through 200 mesh screen 45–80%, for example, 50.5%
Per cent through 325 mesh screen 10–70%, for example, 30.7%

The amount of material which is susceptible to loss due to attrition may average from 5 to 50%, for instance, 20%. This material as carried in the vapors and lost is believed to be of an average diameter of 20 microns or less.

Such catalyst as formed and commercially dried has a moisture content V. M., i. e., loss of water on ignition to 1700° F., of about 15 to 20%. When properly dried and calcined according to my method such treatment yielded a preconditioned catalyst of greater stability, and loss of fines in the cracking may be materially reduced. For example, the attrition loss of catalyst properly thermally conditioned by calcination was about one-half that of the catalyst not so treated.

Such catalysts are prepared in granular form of the sizes indicated and reduced to about 15 to 20% moisture by drying at the plant at which the catalyst is manufactured. Catalyst is then shipped to the catalytic unit. However, in my process as herein described, the catalyst need not be dried and may be shipped moist as received from the filters or perhaps be partially dried. Moisture contents up to 40 to 45% are permissible.

In the fluid-type catalyst unit the oil charge is introduced under pressure through line 1. It meets in injector 2 hat catalyst at a temperature of about 1000 to 1050° F. which descends from the regenerator 23. As will be explained below the catalyst is suspended in vapor to form a lower density vapor stream. This stream is at sufficient pressure so that in conjunction with the static head of the catalyst in stand pipe 3 it is caused to enter line 5. If liquid oil is fed through line 1, the high density stream descending through 3 which is at the high temperature of the regenerator flashes the oil into vapor and the catalyst is itself cooled to the temperature required in the catalytic reactor 6.

The mixed vapor and catalyst stream in 5 is now at a lower density than the catalyst-vapor stream in 3 and enters the catalyst chamber 6. In this chamber the vapor undergoes catalytic cracking at a temperature of from 850 to 950° F. The temperature may be maintained by imparting heat to the vapor catalyst mixture in 6 by coils or other heat control mechanism, not shown as it is not a part of this invention, in order to compensate for heat losses by radiation and convection and due to the endothermic heat of cracking.

In catalyst chamber 6, the vapor separates from most of the catalyst in space 7 and enters into cyclone separator 8 positioned at the top of the reactor 6. The details of construction of this cyclone separator forms no part of this invention and is conventional in modern fluid catalyst units. The vapors and any entrained catalyst enter the separator through inlet 9 and the vapors are discharged through line 16 while the separated catalyst is returned through 10 to the fluid mass in 6. The discharged vapors pass to conventional fractionator units, schematically illustrated at 17, wherein the vapors are separated into fuel gases, propane, propene, butane, butene, iso-butane, isobutene, pentane, iso-pentane, pentene, iso-pentenes, gasoline, kerosene, gas oil, fuel oil, etc., and other products of the catalytic conversion process.

The catalyst-vapor mixture in the reactor 6 on separation of the vapors in space 7 forms a turbulent mass of vapor and catalyst of relatively high density, i. e., higher weight per cubic foot as compared to the density in the line 5. A portion of this mass is trapped in 12 by baffle 11. The vapor associated with the catalyst is displaced by introducing some stripping medium such as steam through 13.

The relatively high density fluid mass of steam and catalyst descends through stand pipe 14 controlled by valve 15 into injector 19 on line 20 where it meets regenerating gas introduced through line 18.

The regenerating gas may be air introduced by compressor 39 through 41, valve 42, and line 38 or air and flue gas may be introduced through 43 and valve 44 or recirculated from the regenerator via 31, 45, valve 46, valve 48, line 41 and line 38.

The catalyst, which is contaminated with carbon and other products of the reaction, passes together with the air through line 20, valve 89 being opened, and enters line 21, valve 22 being opened, and enters regenerator 23. The air burns the carbon from the catalyst thus regenerating the catalyst. The temperature of the regeneration is controlled by regulating the concentration of oxygen by regulating the air to flue gas ratio which may be added to the air to regulate such concentration. The temperature is additionally controlled by means of cooling coils and heat exchangers associated with the catalyst undergoing regeneration in the regenerator, not shown in the drawing. By this means the temperature of the regenerator may be controlled. Usually temperature in excess of 1000 to 1050° F. is not desirable. However, the catalyst temperature should not be lower than the auto-ignition temperature of the carbonaceous deposit under the condition of the regeneration.

The combustion gases are separated from the bulk of the regenerated catalyst in the disengaging space 24 and enter through 25 into the cyclone 26. The separated catalyst is returned through 27 and the liberated gases discharged through line 28, pass to the electrical precipitator 29. The fines not separated in the cyclone 26 are separated in the precipitator 29 and are removed through 30. The tail gases are discharged through line 31 under control of the back pressure valve 32 and enter the main 33.

The mixture of vapors and solids in the regenerator 23 are at a relatively high density. The mixture passes into the trap 36 formed by baffle 34. The gases are displaced by means of steam introduced through 37.

This completes a cycle of operation. The catalyst thus is circulated between regeneration and reaction zones, losing fines through line 16 and line 28 due to attrition of the catalyst to produce particles of such small size that they escape the cyclones 26 and 8. Such particles are usually of average diameter of about 20 microns or less.

When it is desired to add make-up catalyst, bin 56 is charged with catalyst through 57 controlled by valve 58. The catalyst may either be pressured into pipe 69 by means of flue gas introduced via 62, valve 63 and valve 61, valve 67 being closed, or the gas from line 45 may be introduced via 64, 65, 66, valve 63 being closed and valves 67 and 61 being open. Gas may be introduced into the chamber 56 through 68 to convert the catalyst in chamber 56 into a fluid mass of high density. For this purpose line 45 may be fed by gases from 31, valve 45A being opened, so as to introduce combustion gases from the regenerator, or it may be fed by gases produced in the combustion chamber 49 diluted by cold air by-passed from 47 and valve 48, and passing via valve 46. The operation of this combustion chamber will be described below.

The charge of catalyst in 56 mixed with the gas and forming a high density column in line 59 passes through valve 60. This material is transferred into the thermal preconditioner 72 through 69. To accomplish this transfer gas is introduced through line 85 and valve 86 and the mixed gas and solids pass through line 69 and valve 70 and line 71 into 72. When all of the material is transferred from 56, valve 60 is closed.

The gases employed for the transfer passing via 85 and 86 should be at relatively low temperature, say 200 to 600° F. It is not desired at this state of the operation to increase the temperature of the catalyst suddenly to a high level. The gases may be obtained in several ways. The hot regenerator gases passing through line 45 and 46 may be mixed with cold air through line 47 and valve 48 to form a gas of desired temperature in 85.

Instead or in addition to recirculating the regenerator gases via line 45, I may employ another source of hot combustion gases at the desired pressure. This is provided by a combustion zone 49 in which fuel gas or oil entering via line 50 and valve 51 is burned by air under pressure passing via 52 and valve 53. The combustion gases under pressure are passed into line 85 where they may be mixed with air passing through line 47 and valve 48.

The gases thus transfer the catalyst into the thermal preconditioner 72. Therein the catalyst is suspended in the gas body in the chamber 72 in highly turbulent and fluid state. For purposes of illustrative explanation it may be compared to a boiling liquid. The free gases disengage from most of the catalyst in space 73 above the level of the fluidized catalyst and are discharged through 75 into the cyclone 74 and through line 77. The separated catalyst which has been entrained in the vapors is returned through 76.

At the start of the operation the catalyst which is at an initially relatively low temperature in 72 is heated by passing hot gases through lines 85, 69, 71 and blowing the gases through the relatively high density body of fluidized catalyst in the chamber 72. The relatively low density fluid from 69 bubbles up through the fluid catalyst body in 72 and discharges into space 73.

The temperature of the body of catalyst and gas in 72 is gradually raised from the initial temperature of the catalyst in 72, which may be atmospheric temperature, to a temperature of 300 to 600° F., by gradually increasing the temperature of the gases introduced through 85. This is accomplished by proportioning the hot and cold gases in 85. During this operation the catalyst is reduced in moisture content. Thus, if it is charged at a moisture content of 30 to 40%, it will be reduced to a moisture content of about 5 to 8% to 20% by subjecting this catalyst to a temperature of 300 to 600° F. for a sufficient period of time. It is preferable to cause this temperature elevation to occur gradually at a substantially uniform rate, raising the temperature at a rate, for example, of from about ½ to about 10° F. per minute. The catalyst is then additionally raised in temperature above 600° F. to the temperature of the regenerator. Where the regenerator temperature is about 950° F. to about 1200° F., but preferably not above 1050° F., the catalyst may be raised to this temperature in from about 1 to about 10 to 15 hours and held at this temperature for a period of time of about two to five hours. The rate of rise of temperature may be controlled by regulating the temperature and volume of the gas. The rate of temperature rise and the length of time during which the catalyst is best kept at the calcination temperature will vary as for different catalysts. When the catalyst has reached the temperature of the regenerator, and steam stripping is desired, valve 70 is closed and stripping steam is introduced via 80 into trap 79. The steam displaces the flue gas or air employed in the thermal conditioner 72. This, of course, is not necessary where the hot gas introduced via 85 was high temperature steam.

The high density stream of steam and catalyst descends via stand pipe 81 and valve 82 and is fed via injector 83 into line 21 by the same gas as is used in transferring the catalyst from the reactor to the regenerator, i. e., the gas from line 38, passing through valve 42. The rate of transfer is controlled by valve 82. At this time valve 88 in line 87 is closed. When the transfer of the catalyst to 23 is completed, valve 82 is closed.

Instead of making an intermittent transfer, the system may be controlled to maintain a body of preconditioned catalyst in 72 and the catalyst is continuously fed into line 21 as catalyst is needed by control of the valve 82. In such manner a substantially constant concentration of catalyst of constant particle size is maintained in chambers 23 and 6. Catalyst of required particle size or required amount is added as catalyst is lost via lines 28 and 16. Instead of transferring the catalyst via line 21, the preconditioned catalyst may be fed by opening valve 88, which is otherwise closed, and the preconditioned catalyst will be added to the catalyst in line 3 to pass directly to the catalytic reaction zone instead of directly to the regenerator.

While I have described a particular embodiment of my invention for the purpose of illustration, it should be understood that various modifications and adaptations thereof may be made within the spirit of the invention as set forth in the appended claims.

I claim:

1. In a process for preconditioning an acid activated sub-bentonite catalyst for use in a process for catalytic cracking of hydrocarbons which catalytic cracking process comprises circulating such catalyst in a cracking cycle between a reactor and a regenerator in which cycle said catalyst is contacted with a stream of hydrocarbons at an elevated cracking temperature in said reactor and spent catalyst and reacted gases separately removed and such spent catalyst introduced into said regenerator wherein said catalyst is regenerated by passing an oxygen containing gas through said spent catalyst and regenerator gases are removed from said regenerator and said regenerated catalyst introduced into said reactor, the steps which comprise gradually heating acid activated sub-bentonite unused cracking catalyst containing more than about 15% V. M. and which, when subjected to too rapid heating by being suddenly raised from atmospheric to the temperature of the catalytic cracking system, undergoes an impairment in resistance to attrition, to an elevated temperature above that required to dehydrate the catalyst and at approximately the temperature to which said catalyst is to be subjected in said catalytic cracking system and at a rate of heating sufficiently low that resistance to attrition is not substantially impaired, and introducing said catalyst to said catalytic cracking system at a temperature of approximately the temperature of the catalyst in the system at the point of introduction.

2. In a process for preconditioning an acid activated sub-bentonite catalyst for use in a process for catalytic cracking of hydrocarbons which catalytic cracking process comprises circulating such catalysts in a cracking cycle between a reactor and a regenerator in which cycle said catalyst is contacted with a stream of hydrocarbons at an elevated cracking temperature in said reactor and spent catalyst and reacted gases separately removed and such spent catalyst introduced into said regenerator wherein said catalyst is regenerated and said regenerated catalyst introduced into said reactor, the steps which comprise gradually heating acid activated sub-bentonite unused cracking catalyst containing more than about 15% V. M. to an elevated temperature corresponding approximately to the temperature to which said catalyst is to be subjected in said catalytic cracking process to reduce the V. M. content to below about 10% by gradually heating said catalyst at a rate of from about one-half to about 10° F. per minute and introducing said catalyst to said catalytic cracking process at a temperature approximately that of the catalyst in said process at the point of introduction.

3. In a process for preconditioning an acid activated sub-bentonite catalyst for use in a process for catalytic cracking of hydrocarbons which catalytic cracking process comprises circulating such catalysts in a cracking cycle between a reactor and a regenerator in which cycle said catalyst is contacted with a stream of hydrocarbons at an elevated cracking temperature in said reactor and spent catalyst and reacted gases separately removed and such spent catalyst introduced into said regenerator wherein said catalyst is regenerated by passing an oxygen containing gas through said spent catalyst and regenerator gases are removed from said regenerator and said regenerated catalyst introduced into said reactor, the steps which comprise thermally preconditioning fresh unused catalyst produced by acid activation of sub-bentonite and containing more than about 15% V. M. by gradually heating said acid activated sub-bentonite to a temperature within the range of about 400 to 600° F. to gradually reduce the V. M. of said acid activated sub-bentonite to a V. M. in the range of about 5 to 10% and further elevating the temperature of said acid activated sub-bentonite to a more elevated temperature but not in excess of about the temperature of said regeneration, said heating and temperature elevation being at a rate so as to raise said activated sub-bentonite to the maximum temperature attained in said preconditioning operation in not less than one hour and introducing said thermally preconditioned catalyst into the circulating stream of catalyst in said catalytic cracking process at approximately the temperature prevailing at the point of introduction.

4. In a catalytic cracking system in which catalyst containing water removable by raising the temperature of the catalyst is introduced to the system at a zone under such conditions, particularly of temperature, that the catalyst upon being introduced is suddenly subjected to a rise in temperature from about atmospheric to the elevated temperature at said zone of introduction and desired characteristics of the catalyst are impaired by such sudden rise in temperature by too rapid removal of said water in said catalyst, the improvement for introducing said catalyst to such a catalytic cracking system which comprises gradually heating said catalyst, prior to introduction, to about the temperature prevailing in said zone at such a low rate that said water is driven off from said catalyst at a rate sufficiently low that said characteristics are substantially unimpaired, and introducing said catalyst to said zone at about the temperature of the catalyst in said zone.

5. A method of preconditioning catalyst containing water removable by raising the temperature thereof but too rapid removal of which impairs the catalyst prior to introduction into a fluidized catalyst stream of a fluid catalytic cracking process circulating from a catalyst reactor to a catalyst regenerator and back to said catalyst reactor, which comprises maintaining a relatively high density fluidized mass of catalyst and gas in a zone exterior of said circulating stream, passing hot gas through the fluidized catalyst mass in said zone to condition said catalyst by gradually elevating the temperature thereof to about the temperature to which said catalyst is subjected in said catalytic cracking process and thus removing water from said catalyst at such a low rate that said catalyst is substantially unimpaired, and transferring said heated conditioned catalyst in fluidized state from said zone into the stream of catalyst and gas circulating from the catalytic reactor to the catalyst regenerator.

ROBERT B. SECOR.

REFERENCES CITED

The following references are of record in the file of this patent:

UNITED STATES PATENTS

| Number | Name | Date |
|---|---|---|
| 1,984,380 | Odell | Dec. 18, 1934 |
| 2,289,329 | Prickett | July 17, 1942 |
| 2,311,564 | Munday | Feb. 16, 1943 |
| 2,325,516 | Holt et al. | July 27, 1943 |
| 2,327,175 | Conn | Aug. 17, 1943 |
| 2,054,441 | Peebles | Sept. 15, 1936 |
| 2,302,209 | Goddin | Nov. 17, 1942 |
| 2,341,193 | Scheineman | Feb. 8, 1944 |
| 1,954,534 | Rembert | Feb. 6, 1934 |
| 2,216,262 | Bloch et al. | Oct. 1, 1940 |
| 2,222,400 | Butz | Nov. 19, 1940 |
| 2,366,372 | Voorhees | Jan. 2, 1945 |
| 2,384,943 | Marisic | Sept. 18, 1945 |
| 1,402,112 | Tellier | Jan. 3, 1922 |
| 1,838,621 | Haseman | Dec. 29, 1931 |
| 2,180,576 | Baylis et al. | Nov. 21, 1939 |
| 2,107,215 | Rembert | Feb. 1, 1938 |

FOREIGN PATENTS

| Number | Country | Date |
|---|---|---|
| 383,616 | Great Britain | 1932 |